United States Patent [19]

Takahashi

[11] Patent Number: 4,903,824
[45] Date of Patent: Feb. 27, 1990

[54] CONVEYOR BELT MADE OF CARBON OR CERAMIC FIBERS

[75] Inventor: Susumu Takahashi, Yokohama, Japan

[73] Assignee: Kanto Yakin Kogyo K.K., Japan

[21] Appl. No.: 306,114

[22] Filed: Feb. 6, 1989

[30] Foreign Application Priority Data

Feb. 8, 1988 [JP] Japan .................................. 63-15272

[51] Int. Cl.[4] ............................................. B65G 17/06
[52] U.S. Cl. ...................................... 198/853; 198/952; 198/957
[58] Field of Search ................. 198/952, 957, 850–853; 432/239, 245

[56] References Cited

U.S. PATENT DOCUMENTS 3,824,868 7/1974 Fahrenwald ..................... 198/851 X
4,618,056 10/1986 Cutshall ............................. 198/853

FOREIGN PATENT DOCUMENTS 2177992 2/1987 United Kingdom ................ 198/853

Primary Examiner—Robert J. Spar
Assistant Examiner—Lyle Kimms
Attorney, Agent, or Firm—Shlesinger, Fitzsimmons & Shlesinger

[57] ABSTRACT

A conveyor belt for circulating within a high temperature furnace, which is consisted of a desired number of flattened cylinders, each of the cylinders being composed of a number of carbon or ceramic fibers cylindrically wound up and flattened. The fibers extend substantially in parallel with a longitudinal or moving direction of the conveyor belt, so that they can exhibit well their tensile strength when the belt is circulated through the furnace. The flattened cylinders are hinged to each other by hinge pins made of carbon or ceramic materials, and are kept as flattened and stretched by means of planar stretchers located within an inner hollow space of each of the flattened cylinders and made also from carbon or ceramic materials.

2 Claims, 2 Drawing Sheets

CONVEYOR BELT MADE OF CARBON OR CERAMIC FIBERS

BACKGROUND OF THE INVENTION

This invention relates to a conveyor belt which is fabricated by carbon or ceramic fibers and more particularly it relates to an endless conveyor belt which is circulated through a high-temperature heat treatment furnace and made of heat-resistant carbon or ceramic fibers.

As the above-mentioned kind of endless conveyor belt which acts as conveyor means for carrying articles to be treated through a furnace, metallic mesh belts are most commonly employed. These heat-resistant mesh belts are fabricated by a combination of coiled wires and linear wires which are both made of heat-resistant steel wires. While heat-resistability of such belts are expressed by their tensile strength under a high temperature, convensional heat-resistant steel meshes can endure only up to 1,200° C.

In other words, although strength afforded to those heat-resistant steel mesh belts depends on a kind of steel materials composing the belts, it is a matter of course that mesh belts having a strength more than a maximum tensile strength of steel materials under a high temperature can never be obtained so long as they are made of steel materials.

It shall be noted also that so that heat-resistant mesh belts can attain strength close to a maximum tensile strength of steel materials composing the belts, wires made from said steel materials and composing said mesh belts have to be afforded with large diameters. This results in making mesh belts very heavy. When a dead load of such mesh belts is compared with weights of articles carried on the mesh belts, the belts are often driven not for carrying the articles but only for circulating themselves. This results consequently in providing disadvantageous conveyor means.

BRIEF SUMMARY OF THE INVENTION

In view of the above, this invention is to provide a novel conveyor belt which is free from the above-mentioned drawbacks inherent to conventional heat-resistant metallic mesh belts.

In this invention, its conveyor belt is fabricated of its main parts by carbon or ceramic fibers which have a high tensile strength under a high temperature and light in weight.

Carbon fibers employed in this invention are composed of filaments of high strength and resiliency having a tensile strength of 100–500 Kg/mm$^2$ at a high temperature of 1,000°–3,000° C., and ceramic fibers are of a silicon carbide system or alumina system having a tensile strength of 100–300 Kg/mm$^2$ at a high temperature of 800°–1,000° C.

While these fibers are extremely strong against a tensile force, they are somewhat weak against bending and shearing forces. Such weakness is uniquely overcome in this invention by that fibers are made substantially in alignment with a running direction of a conveyor belt which is composed of the fibers, that is, a direction to which a tensile force exerts.

More in concrete, the above-mentioned kind of fibers of 5–10 μm in diameter are continuously wound up to a cylindrical shape of 20–40 mm in diameter and of about 1 mm in thickness. The height or width of said cylindrical shape will be correspondent to a width of a desired conveyor belt. The fibers wound up thus to a cylindrical shape are applied by carbonic adhesives so that the fibers are bound to each other.

Fibered cylinders thus obtained are flattened, and at both lateral edges of each flattened cylinder which extend transversely to fiber-extending directions, there are provided a plurality of rectangular mortise cuts of a same dimension and with a equal distance therebetween. By means of said cuts which work as hinge joints, a number of the flattened fibered cylinders are trained to form a conveyor belt. The trained flattened cylinders are connected to each other by means of hinge pins which were made by a number of the same fibers twisted to and stiffened by carbonic adhesives to linear wires. The hinge pins are fitted at both ends with nuts.

DETAILED DESCRIPTION

A preferred embodiment of this invention is explained hereunder with reference the accompanying drawing.

Figure 1:
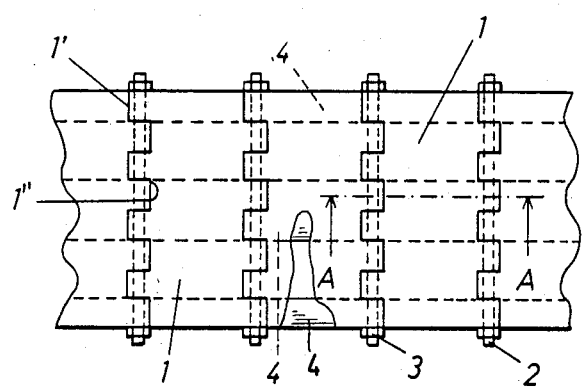
FIG. 1 is a plan view of a part of the conveyor belt made in accordance with this invention and cut away in part for purposes of illustration.
Figure 2:
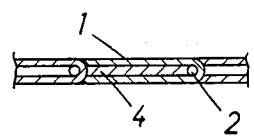
FIG. 2 is a sectional view of FIG. 1 along its line A—A.

In order to obtain flattened cylinders 1 which are illustrated in FIGS. 1 and 2, carbon fibers of 5–10 μm in diameter were wound up onto a tube of 30 mm in diameter, so that the fibers formed a cylindrical layers of about 1 mm in thickness and 100 mm in width or axial length. The fibers thus wound up to a cylinder were applied with a carbonic adhesive of a pitch system, whereby they were bound to each other. A number of fibered cylinders thus obtained were flattened, whereby, as illustrated in the drawing, each collapsed cylinder has formed therein a generally planar, hollow space. So that the cylinders could be trained by means of hinge joints, rectangular mortise cuts 1" of 6 mm in depth were formed at both lateral ends of each cylinder, with a distance of 10 mm therebetween. Said cuts 1" and those tenon projections 1' which were formed in consequence of the formation of the cuts 1", composed hinge joints by which a desired number of fibered cylinders 1 were connected to each other in series. Hinge pins 2 of the aforementioned constructions were inserted through the hinge joints, and both free ends of each hinge pin were mounted with nuts 3.

Stretchers 4 which are made of carbon plates or textiles, were inserted into the inner hollow space of each flattened cylinder 1, so that each cylinder could be kept flattened and stretched. A part of each stretcher 4 is preferably bound to an inner lower surface of the flattened cylinder, or to the hinge pin.

A conveyor belt thus fabricated in accordance with this invention, was subjected to 300° C. at atmosphere for making the adhesive infusible, and subsequently subjected to a carbonization treatment within a furnace held under an innert atmosphere and at 1,000° C.

The conveyor belt was circulated through a furnace of 2 m in length held at a maximum temperature of 2,200° C., atmosphere of the furnace being a nitrogen gas during a temperature raising cycle and an argon gas after the temperature reached 2,000° C. The conveyor belt stood well for an operation of long time, and its tensile strength was sufficiently strong.

I claim:

1. A conveyor belt for use at a high temperature, which comprises a plurality of flattened cylinders made of a material selected from the group consisting of carbon and ceramic fibers, said fibers extending substantially in alignment with a running direction of the conveyor belt, said cylinders being hinged to each other in series by tenon joints integrally formed from each cylinder, and by hinge pins which pass through said joints, said pins also being made of said material.

2. A conveyor belt as claimed in claim 1, in which a generally planar, hollow space is formed in each of said flattened cylinders between, spaced parallel portions thereof, and a stretcher, also made of said material is insertedly fitted to said hollow space of each cylinder, a part of the stretcher being fixed to a wall of the cylinder or to the hinge pin.

* * * * *